United States Patent
Qin

(10) Patent No.: US 11,307,450 B2
(45) Date of Patent: Apr. 19, 2022

(54) DISPLAY PANEL HAVING MICRO LEDS, AND METHOD FOR CONTROLLING DISPLAY PANEL HAVING MICROS LEDS

(71) Applicant: BOE Technology Group Co., Ltd., Beijing (CN)

(72) Inventor: Guangkui Qin, Cambridge, MA (US)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/002,819

(22) Filed: Aug. 26, 2020

(65) Prior Publication Data

US 2022/0066260 A1    Mar. 3, 2022

(51) Int. Cl.
*G02F 1/1335* (2006.01)
*G02F 1/137* (2006.01)

(52) U.S. Cl.
CPC .... *G02F 1/133526* (2013.01); *G02F 1/13718* (2013.01); *G02F 1/13793* (2021.01); *G02F 2201/343* (2013.01)

(58) Field of Classification Search
CPC combination set(s) only.
See application file for complete search history.

(56) References Cited

U.S. PATENT DOCUMENTS

| 5,299,037 A | * | 3/1994 | Sakata | G02F 1/1335 349/1 |
| 6,166,792 A | * | 12/2000 | Miyawaki | G02F 1/136277 349/113 |

\* cited by examiner

*Primary Examiner* — Lauren Nguyen
(74) *Attorney, Agent, or Firm* — Fay Sharpe LLP

(57) ABSTRACT

Disclosed are a display panel, a method for controlling a display panel, and a display device. The display panel includes a light-emitting substrate and an optical modulation structure which are laminated; and the optical modulation structure supports a first state and a second state which are switchable. In the first state of the optical modulation structure, a first light-emitting unit forms an image at a first position. In the second state of the optical modulation structure, the first light-emitting unit forms an image at a second position. According to the present disclosure, with the optical modulation structure, each light-emitting unit is enabled to form two images at different positions in different states. In this way, the state of the optical modulation structure can be continuously switched without increasing the number of light-emitting units, thereby improving a display effect of the display panel.

18 Claims, 8 Drawing Sheets

DISPLAY PANEL HAVING MICRO LEDS, AND METHOD FOR CONTROLLING DISPLAY PANEL HAVING MICROS LEDS

TECHNICAL FIELD

The present disclosure relates the field of display technologies, and in particular, relates to a display panel, a method for controlling a display panel, and a display device.

BACKGROUND

A display panel is a panel structure with a display function.

The display panel includes a base substrate and a plurality of light-emitting units on the base substrate. A light-emitting unit may form a pixel of the display panel. The more the number of light-emitting units per unit area on the base substrate is, the higher a pixel density of the display panel is, and further the better a display effect is.

SUMMARY

Embodiments of the present disclosure provide a display panel, a method for controlling a display panel, and a display device. The technical solution is as follows.

According a first aspect of the present disclosure, a display panel is provided. The display panel includes a light-emitting substrate and an optical modulation structure which are laminated; wherein the light-emitting substrate includes a plurality of light-emitting units; and the optical modulation structure supports a first state and a second state which are switchable; wherein in the first state of the optical modulation structure, a first light-emitting unit of the plurality of light-emitting units forms an image at a first position on a side of the optical modulation structure proximal to the light-emitting substrate; in the second state of the optical modulation structure, the first light-emitting unit forms an image at a second position on the side of the optical modulation structure proximal to the light-emitting substrate; on a plane parallel to the optical modulation structure, a distance between the first position and the second position is less than a distance between the first light-emitting unit and a second light-emitting unit; and the second light-emitting unit is any one of the plurality of light-emitting units other than the first light-emitting unit.

Optionally, in the first state of the optical modulation structure, optical path differences of regions of the optical modulation structure are equal.

Optionally, the plurality of light-emitting units are arranged in rows and columns; and in the second state of the optical modulation structure, a lengthwise direction of a line connecting the first position and the second position is parallel to one of a row direction and a column direction in which the plurality of light-emitting units are arranged.

Optionally, a distance between the first position and the second position is approximately ½ of a distance between the first light-emitting unit and the second light-emitting unit, and the second light-emitting unit and the first light-emitting unit are adjacent light-emitting units in the arrangement direction of the plurality of light-emitting units.

Optionally, in the second state of the optical modulation structure, the optical path differences of the regions of the optical modulation structure periodically change.

Optionally, in the second state of the optical modulation structure, the optical modulation structure is provided with a plurality of periodic regions, wherein the optical path differences in the periodic regions gradually change along the lengthwise direction of the line connecting the first position and the second position, and a difference between a maximum optical path difference and a minimum optical path difference of the periodic regions is an integer multiple of a wavelength of light emitted by the light-emitting unit in the optical modulation structure.

Optionally, the optical modulation structure includes a liquid crystal lens panel.

Optionally, the liquid crystal lens panel includes a liquid crystal layer and an electrode component, wherein the electrode component is configured to apply a periodically changing electric field to the liquid crystal layer, such that optical path differences of regions of the liquid crystal layer periodically change.

Optionally, the liquid crystal lens panel includes a liquid crystal layer, a lattice structure inside the liquid crystal layer, and an electrode component, wherein the lattice structure is configured to enable the sensitivity to a voltage of regions of the liquid crystal layer to periodically change.

Optionally, a lattice density of the lattice structure periodically changes.

Optionally, a material of the lattice structure includes a polymer.

Optionally, the electrode component includes electrode layers on both sides of the liquid crystal layer.

Optionally, the liquid crystal lens panel includes a lens substrate, a liquid crystal layer, and an electrode component; wherein the lens substrate has a plurality of lenses, the liquid crystal layer covers the plurality of lenses, a refractive index of the liquid crystal layer in a first operating state is the same as a refractive index of the lenses, and the first operating state is one of an operating state when the electrode component applies a voltage to the liquid crystal layer and an operating state when the electrode component does not apply the voltage to the liquid crystal layer.

Optionally, the liquid crystal lens component includes one of a cholesteric liquid crystal and a blue phase liquid crystal.

Optionally, the liquid crystal lens component includes a double-layer orthogonally oriented liquid crystal structure, wherein the double-layer orthogonally oriented liquid crystal structure includes two sub-liquid crystal layers, and the liquid crystals in the two sub-liquid crystal layers are perpendicularly oriented.

Optionally, the optical modulation structure includes a liquid lens.

Optionally, in the first state of the optical modulation structure, the optical path differences of the regions of the optical modulation structure are equal, and in the second state of the optical modulation structure, the optical path differences of the regions of the optical modulation structure periodically change;

the plurality of light-emitting units are arranged in rows and columns, and in the second state of the optical modulation structure, a lengthwise direction of a line connecting the first position and the second position is parallel to one of a row direction and a column direction of the plurality of light-emitting units;

a distance between the first position and the second position is approximately ½ of a distance between the first light-emitting unit and the second light-emitting unit, and the second light-emitting unit and the first light-emitting unit are adjacent light-emitting units in the arrangement direction of the plurality of light-emitting units;

in the second state of the optical modulation structure, the optical modulation structure is provided with a plurality of periodic regions, wherein the optical path differences in the periodic regions gradually change along the lengthwise direction of the line connecting the first position and the second position, and a difference between the maximum optical path difference and the minimum optical path difference of the periodic regions is an integer multiple of the wavelength of light emitted by the light-emitting unit in the optical modulation structure; and the optical modulation structure includes a liquid crystal lens panel including liquid crystal layer and an electrode component, wherein the electrode component is configured to apply a periodically changing electric field to the liquid crystal layer to enable optical path differences of regions of the liquid crystal layer to periodically change.

In another aspect, a method for controlling a display panel is provided. The method is applicable to the display panel. The display panel includes a light-emitting substrate and an optical modulation structure which are laminated. The light-emitting substrate includes a plurality of light-emitting units. The optical modulation structure supports a first state and a second state which are switchable. In the first state of the optical modulation structure, a first light-emitting unit of the plurality of light-emitting units forms an image at a first position on a side of the optical modulation structure proximal to the light-emitting substrate. In the second state of the optical modulation structure, the first light-emitting unit forms an image at a second position on the side of the optical modulation structure proximal to the light-emitting substrate. On a plane parallel to the optical modulation structure, a distance between the first position and the second position is less than a distance between the first light-emitting unit and a second light-emitting unit. The second light-emitting unit is any one of the plurality of light-emitting units other than the first light-emitting unit.

The method includes:

acquiring a control signal; and controlling the optical modulation structure to be periodically switched between the first state and the second state according to the control signal.

Optionally, controlling the display panel to be periodically switched between the first state and the second state according to the control signal includes:

according to the control signal, controlling the optical modulation structure to be in the first state in an $m^{th}$ time segment, and controlling the display panel to be in the second state in an $(m+1)^{th}$ time segment, m being a positive integer greater than zero.

Optionally, a length of the time segment is one frame or half of one frame.

In yet another aspect, a display device is provided. The display device includes a display panel. The display panel includes a light-emitting substrate and an optical modulation structure which are laminated.

The light-emitting substrate includes a plurality of light-emitting units.

The optical modulation structure supports a first state and a second state which are switchable. In the second state of the optical modulation structure, a first light-emitting unit of the plurality of light-emitting units forms an image at a first position on a side of the optical modulation structure proximal to the light-emitting substrate. In the second state of the optical modulation structure, the first light-emitting unit forms an image at a second position on the side of the optical modulation structure proximal to the light-emitting substrate. On a plane parallel to the optical modulation structure, a distance between the first position and the second position is less than a distance between the first light-emitting unit and a second light-emitting unit. The second light-emitting unit is any one of the plurality of light-emitting units other than the first light-emitting unit.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The above drawings have shown specific embodiments of the present disclosure, which will be described in more detail below. These drawings and text description are not intended to limit the scope of a concept of the present disclosure in any way, but to explain the concept of the present disclosure for those skilled in the art by referring to the specific embodiments.

DETAILED DESCRIPTION

The present disclosure will be described in further detail with reference to the accompanying drawings, to present the objects, technical solutions, and advantages of the present disclosure more clearly.

Figure 1:
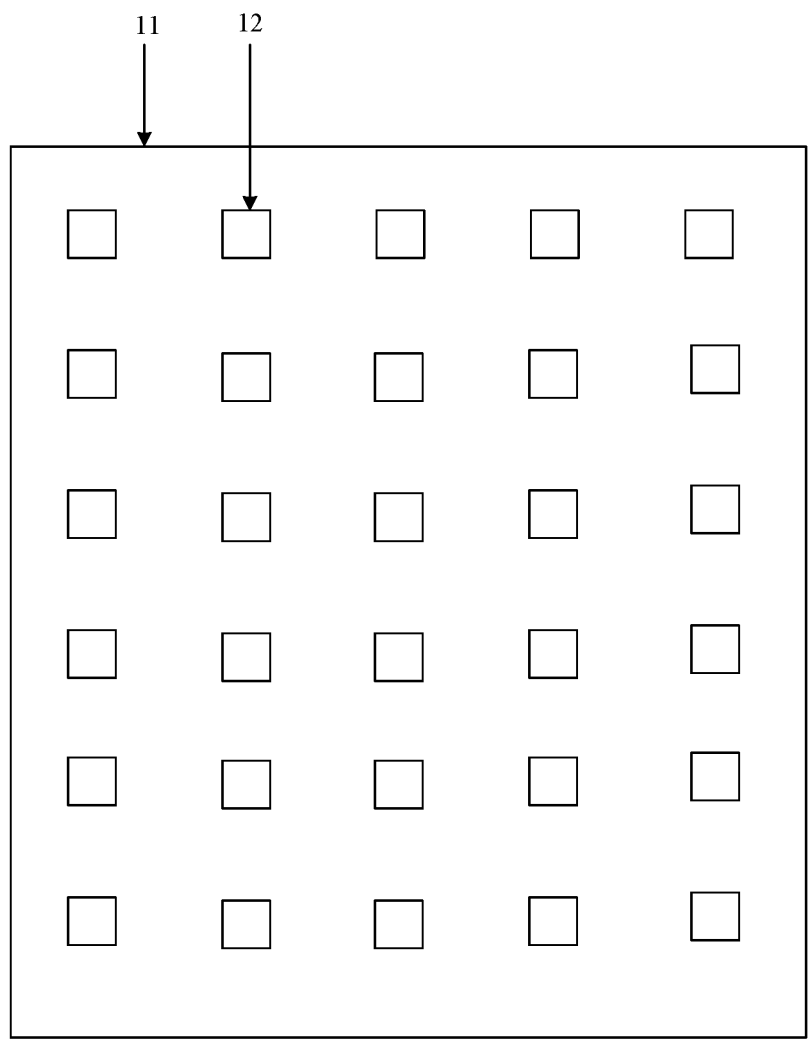
FIG. 1 is a top view of a display panel.

FIG. 1 is a top view of a display panel. The display panel includes a base substrate 11 and a plurality of light emitting diodes (LED) 12 arranged in rows and columns on the base substrate 11. The multiple LEDs may include blue light LEDs emitting blue light, green light LEDs emitting green light, and red light LEDs emitting red light. These multiple LEDs may form multiple pixels, and each pixel may include multiple LEDs. For example, each pixel may include one blue light LED, one green light LED, and one red light LED. With such a structure, by adjusting the brightness of different LEDs in each pixel, all pixels can emit the color light of various colors, and multiple pixels on the display panel can jointly form a colorful image. The multiple LEDs 12 are also covered with cover glass. When viewing the display panel, a user views the images of the LEDs on the side of the cover glass proximal to the base substrate, and each LED displays one image.

The pixels per inch (PPI) refers to the number of pixels included in a unit area of the display panel. For the display panel shown in FIG. 1, the PPI may be considered as the number of LEDs per unit area. The more the number of LEDs per unit area is, the better a display effect of the display panel is.

However, by increasing the LED density to increase the PPI, there are at least the following problems.

1. The number of LED chips required for the display panel is greatly increased, and the cost of the display panel is increased.

2. Due to the factors such as an LED transfer process, a cost and a chip size, the PPI is difficult to increase.

3. As the PPI increases, the size of the LED chip is required to be reduced step by step, and as the chip size decreases, a quantum efficiency of the LED chip drops rapidly, which affects the display effect.

In summary, it is difficult to increase the PPI of the display panel indefinitely. Every increase of the PPI requires great creative work of technicians.

Figure 2:
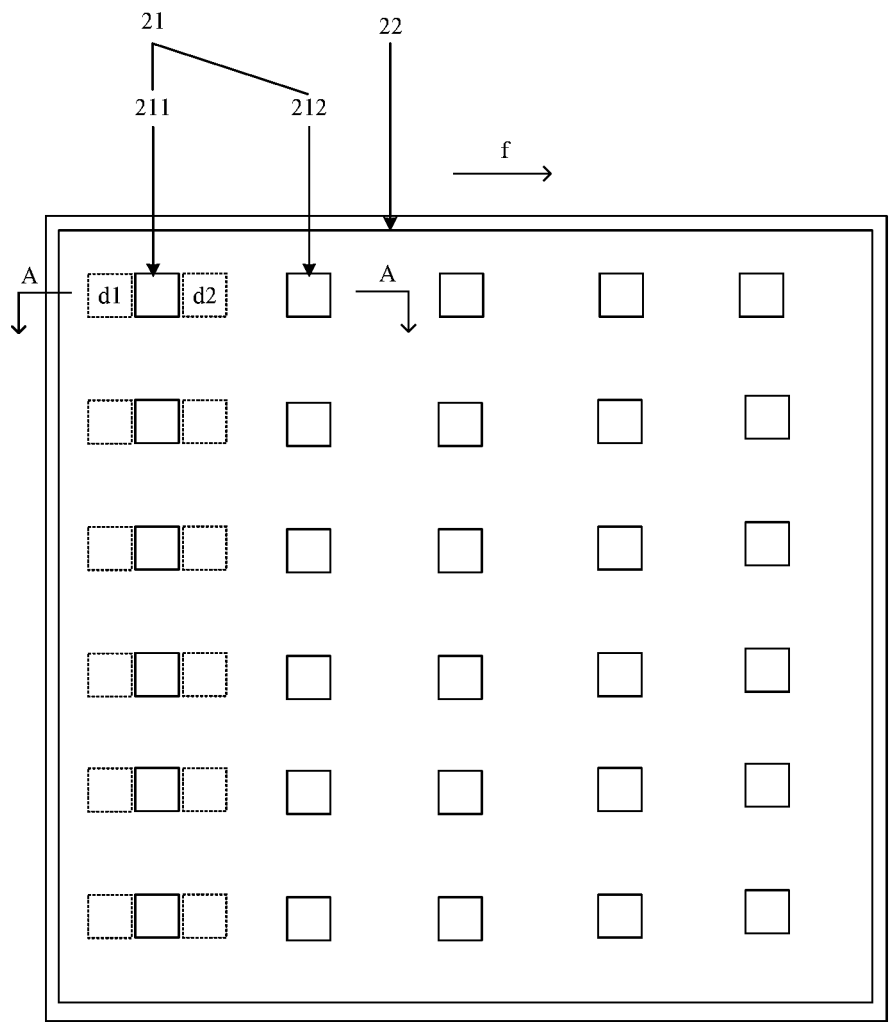
FIG. 2 is a schematic structural diagram of a display panel according to an embodiment of the present disclosure.

FIG. 2 is a schematic structural diagram of a display panel according to an embodiment of the present disclosure. The display panel includes a light-emitting substrate 21 and an optical modulation structure 2 which are laminated.

The light-emitting substrate 21 includes a plurality of light-emitting units, and the optical modulation structure 22 has at least two switchable states. The optical modulation structure 22 and the light-emitting substrate 21 are disposed oppositely, that is, the optical modulation structure 22 and the light-emitting substrate 21 are parallel to each other. When the optical modulation structure is in a first state of the at least two states, the first light-emitting unit 211 of the plurality of light-emitting units 211 forms an image at a first position d1 on a side of the optical modulation structure 22 proximal to the light-emitting substrate 21. When the optical modulation structure 22 is in a second state of the at least two states, the first light-emitting unit 211 forms an image at a second position d2 on the side of the optical modulation structure proximal to the light-emitting substrate. On a plane parallel to the optical modulation structure, a distance between the first position d1 and the second position d2 is less than a distance between the first light-emitting unit 211 and a second light-emitting unit 212, and the second light-emitting unit 212 is any light-emitting unit in the plurality of light-emitting units other than the first light-emitting unit 211.

The second light-emitting unit 212 may be a light-emitting unit adjacent to the first light-emitting unit 211 (as shown in FIG. 2), or the second light-emitting unit 212 may also be a light-emitting unit with the farthest distance from the first light-emitting unit 211. With such a structure, the distance between the images formed by the first light-emitting unit 211 at the two positions (the first position and the second position) will not be too far. Therefore, the problem that a display screen of the display panel may be split into multiple parts when the distance between the images formed by the first light-emitting unit 211 at these two positions is too far is avoided.

Figure 3:
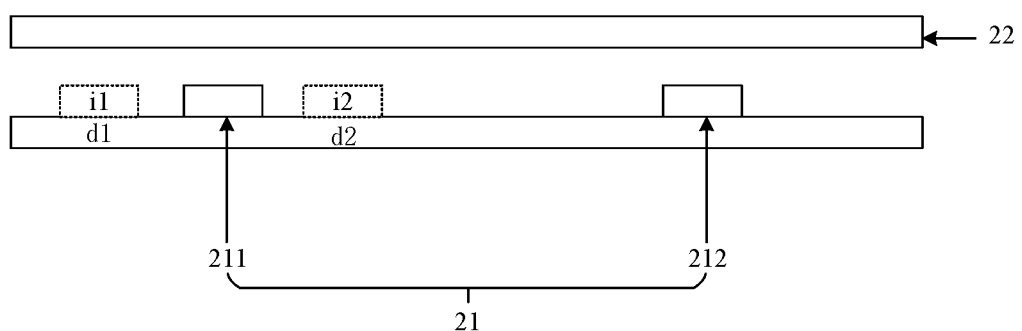
FIG. 3 is a schematic cross-sectional view of the display panel shown in FIG. 2.

As shown in FIG. 3, FIG. 3 is a schematic cross-sectional view of the display panel shown in FIG. 2 at a position AA. It can be seen that the two images of the first light-emitting unit 211 respectively have one image with respect to the optical modulation structure in different states, and there are two images in total (the two images are the image it at the first position d1 and the image i2 at the second position d2). The state of the optical modulation structure is continuously switched in this way. Based on the persistence of vision phenomenon of human eyes, the human eyes can always observe the two images of the first light-emitting unit. Compared with the condition that each LED in the display panel shown in FIG. 1 only has one image (the image here refers to the image formed by each LED at its actual position, and what the human eyes sees through the cover glass on the LED is also the image formed by the LED at the actual position), the display panel shown in FIG. 2 increases the number of images of the light-emitting unit on the display panel, thereby further increasing the PPI of the display panel observed by the human eyes. When a display panel with the same PPI is manufactured, compared with the display panel shown in FIG. 1, in the manufacturing of the display panel according to the embodiment of the present disclosure, the material cost and manufacturing process cost of the light-emitting unit can be saved.

The first light-emitting unit may be any light-emitting unit in the display panel, that is, the optical modulation structure can enable each light-emitting unit to have one image in two states respectively.

Figure 4:
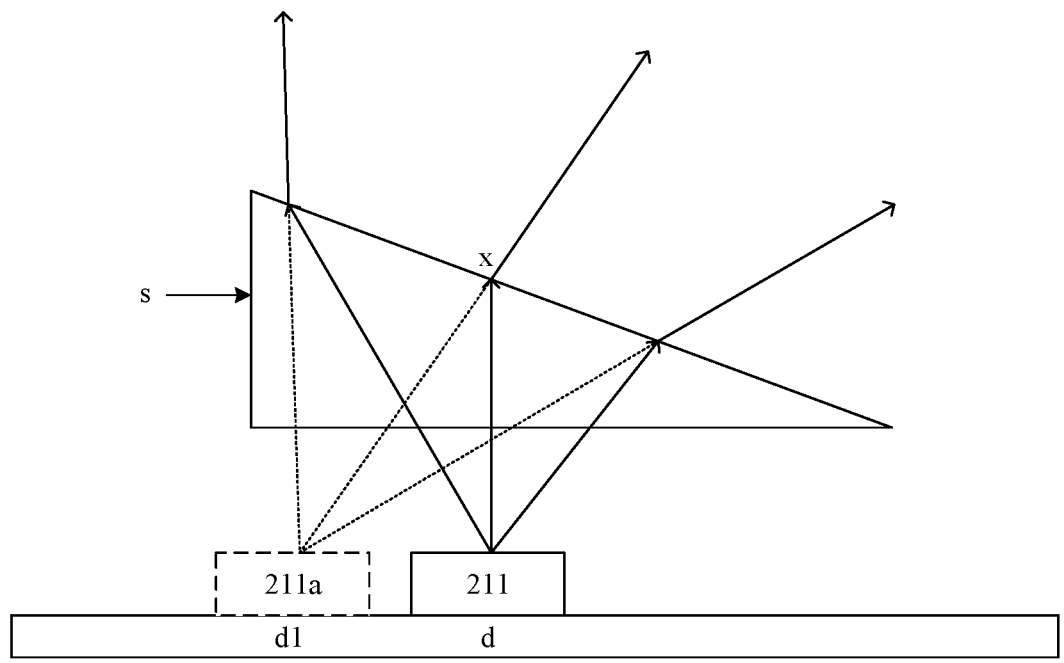
FIG. 4 is an imaging schematic diagram of a first light-emitting unit of a display panel according to an embodiment of the present disclosure.

It should be noted that the first light-emitting unit may respectively form an image at two positions in two states of the optical modulation structure, and a refraction-like principle may be applied. Exemplarily, FIG. 4 is an imaging schematic diagram of the first light-emitting unit 211. It can be seen that a lens structure s may deflect the light emitted by the first light-emitting unit. In this case, an image 211a may be formed at the first position d1 other than the actual position d of the first light-emitting unit 211. The first light-emitting unit seen by the human eyes through the lens structure s is actually the image 211a at the first position d1.

On the basis of FIG. 4, the optical modulation structure may have a structure similar to that of FIG. 4 in one state. In the other state, the optical modulation structure may behave as another structure with a different light deflection ability.

Figure 5:
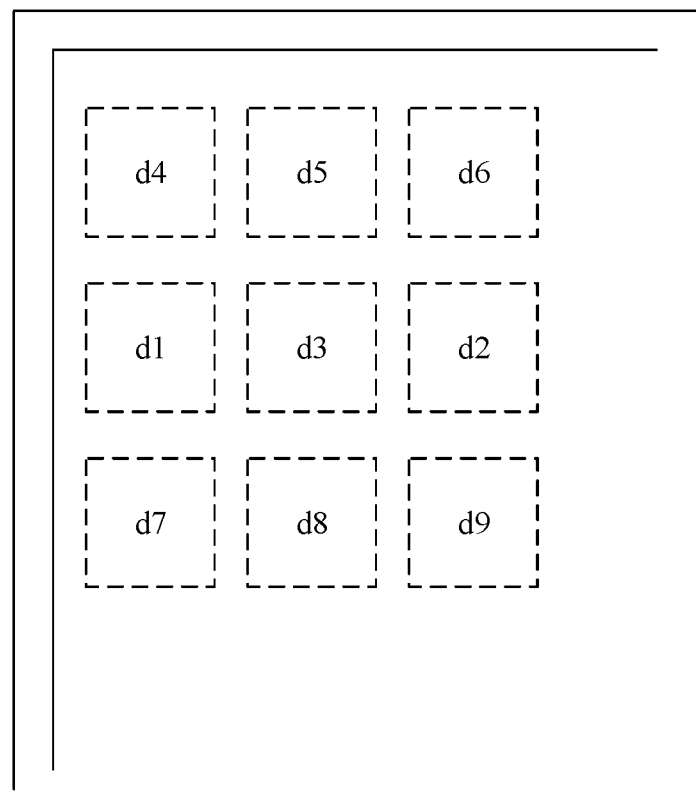
FIG. 5 is an imaging schematic diagram of a first light-emitting unit of another display panel according to an embodiment of the present disclosure.

In addition, the optical modulation structure may also include more states, such as a third state, a fourth state, a fifth state, a sixth state, a seventh state, and an eighth state. For example, the optical modulation structure includes n states, and when the optical modulation structure is in the $x^{th}$ state ($1 \leq x \leq n$), the first light-emitting unit of the plurality of light-emitting units forms an image at the $x^{th}$ position dx on the side of the optical modulation structure proximal to the light-emitting substrate. Exemplarily, FIG. 5 shows an imaging schematic diagram of the first light-emitting unit in the display panel shown in FIG. 1. The first light-emitting unit forms 9 images at 9 positions d1-d9, wherein the image at the third position d3 may be the image formed by the first light-emitting unit at its actual position, and the images at the eight positions: the fourth position d4, the fifth position d5, the sixth position d6, the first position d1, the second position d2, the seventh position d7, the eighth position d8, and the ninth position d9 are the images formed around the actual position of the first light-emitting unit. In this case, the first light-emitting unit forms 9 images in total on one side of the optical modulation substrate proximal to the light-emitting substrate, thereby greatly improving the PPI of the display panel. The embodiment of the present disclosure takes the two states of the optical modulation structure as an example for description, but referring to the principle of these two states, the optical modulation structure obviously may have more states. The first state and the first state involved in the embodiment of the present disclosure are two of the multiple states.

In summary, in the display panel according to the embodiment of the present disclosure, the optical modulation structure enables each light-emitting unit to form the images at different positions in different states, and one of the images is between the two light-emitting units. In this way, without increasing the number of light-emitting units, the PPI observed by the human eyes can be increased by continuously switching the state of the optical modulation structure, thereby improving the display effect of the display panel.

Optionally, in the first state of the optical modulation structure 22, optical path differences of positions of the optical modulation structure 22 are equal.

The optical path difference is the difference between optical paths of two light beams. In the embodiment of the present disclosure, the optical path difference at a certain position of the optical modulation structure 22 may be obtained by converting the difference between a phase before light enters the optical modulation structure 22 and a phase after the light is emergent from the optical modulation structure 22, for example, the phase difference is equal to $(2\pi/\lambda)$*optical path difference.

The optical path differences of the regions of the optical modulation structure 22 are equal. It can be considered that optical performances of the optical modulation structure 22 are equivalent to a transparent film. In this state, the optical modulation structure will not deflect the light passing through the optical modulation structure. Correspondingly, the first position of the first light-emitting unit is the actual position of the first light-emitting unit. In this way, the requirements on a light deflection ability of the optical modulation structure can be reduced, and the manufacturing difficulty of the optical modulation structure is reduced.

In the embodiment of the present disclosure, the light-emitting unit may be a micro light emitting diode (Micro LED).

Optionally, a plurality of light-emitting units are arranged in rows and columns. In the first state of the optical modulation structure, a lengthwise direction of a line connecting the first position d1 and the second position d2 is parallel to one of a row direction and a column direction in which the plurality of light-emitting units are arranged. With such a structure, the arrangement direction of the two images of the first light-emitting unit is the same as the arrangement direction of the light-emitting units on the display panel, thereby improving the orderliness of pixels of the display panel, and further improving the display effect of the display panel.

Referring to FIG. 2, FIG. 2 shows a condition where the lengthwise direction f of the line connecting the first position d1 and the second position d2 is parallel to the row direction in which the plurality of light-emitting units are arranged. However, the lengthwise direction of the line connecting the first position d1 and the second position d2 may also be parallel to the column direction in which the multiple light-emitting units are arranged, which is not limited in the embodiment of the present disclosure. For those skilled in the art, no actual difference is found between the column direction and the row direction, and the lengthwise direction of the line connecting the first position d1 and the second position d2 may be parallel to any one of the column direction or the row direction.

Figure 6:
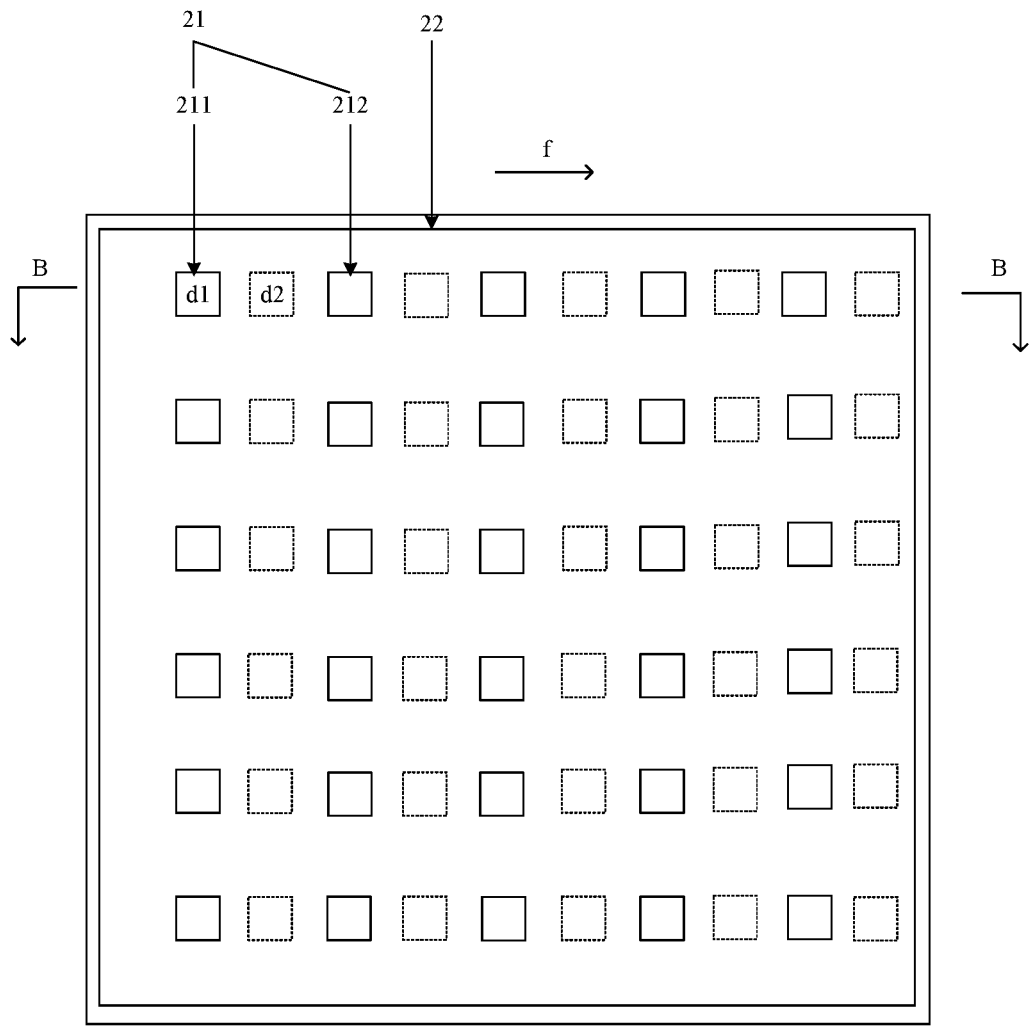
FIG. 6 is a top view of another display panel according to an embodiment of the present disclosure.

Referring to FIG. 6, FIG. 6 is a top view of another display panel according to an embodiment of the present disclosure. The distance between the first position d1 and the second position d2 is approximately ½ of the distance between the first light-emitting unit 211 and the second light-emitting unit 212, and the second light-emitting unit 212 and the first light-emitting unit 211 are adjacent light-emitting units in the arrangement direction of the multiple light-emitting units (FIG. 6 shows that the second light-emitting unit 212 and the first light-emitting unit 211 are two adjacent light-emitting units in the row direction in which the plurality of light-emitting units are arranged, but the second light-emitting unit 212 and the first light-emitting unit 211 may also be two adjacent light-emitting units in the column direction in which the multiple light-emitting units are arranged, which is not limited by the embodiment of the present disclosure).

In the embodiments of the present disclosure, the term "approximately" used herein means that two values or amounts are approximately equal, which may be referenced to the meaning of the symbol of approximate equal in mathematics. For example, by indicating that A is approximately ½ of B, it means that A is approximately equal to ½ of B.

In the structure shown in FIG. 6, the image formed by the first light-emitting unit 211 at the first position d1 is the image formed by the first light-emitting unit 211 at the actual position, and the second light-emitting unit 212 may also form an image at the actual position of the second light-emitting unit 212. The image formed by the first light-emitting unit 211 at the second position d1 is exactly between the two images formed by the first light-emitting unit 211 and the second light-emitting unit 212 at the actual position. The PPI is relatively uniform, which improves the display effect of the display panel.

It should be noted that the image formed by the first light-emitting unit 211 at the second position d1 may also be in other positions between the first light-emitting unit 211 and the second light-emitting unit 212, for example, a position closer to the first light-emitting unit 211, or a position closer to the second light-emitting unit 211, which is not limited in the embodiment of the present disclosure.

Figure 7:
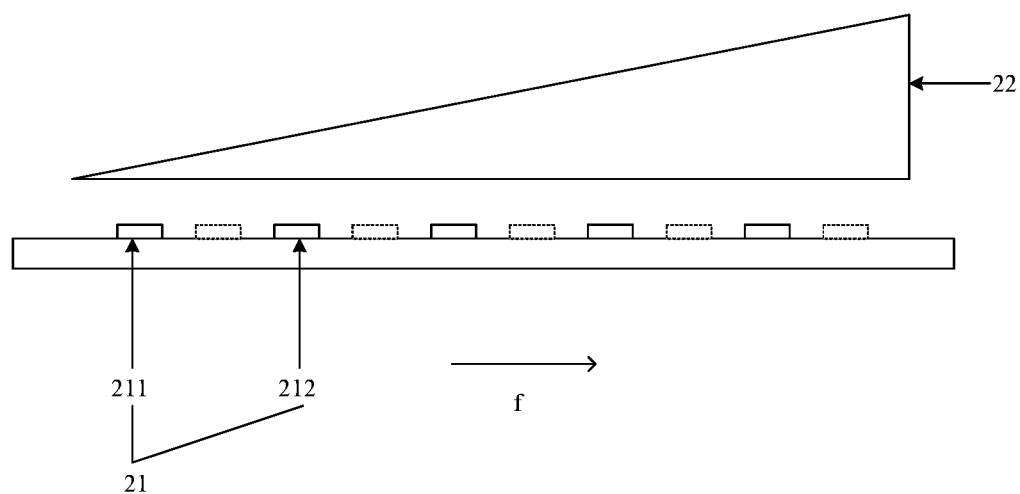
FIG. 7 is a schematic cross-sectional view of a display panel in a second state.
Figure 8:
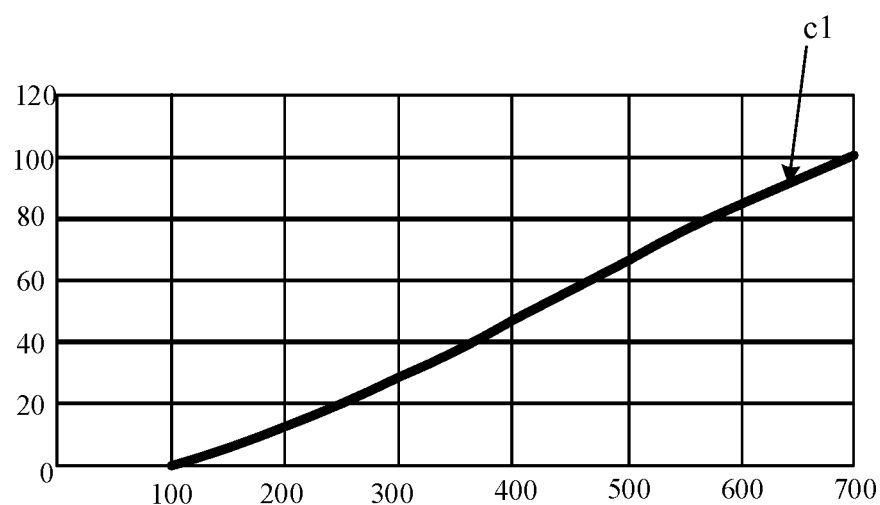
FIG. 8 is a changing trend diagram of an optical path difference of the display panel shown in FIG. 7.

In the display panel shown in FIG. 6, the optical modulation structure 22 may have various structures in the second state. Exemplarily, FIG. 7 is a schematic cross-sectional view of the display panel shown in FIG. 6 at a position B-B in a second state. In the drawing, the optical modulation structure 22 is a wedge-shaped lens. The optical path difference gradually increases along the arrangement direction f of the first light-emitting unit 211 and the second light-emitting unit 212. For example, a changing trend of the optical path difference of the optical modulation structure 22 may be as shown in FIG. 8. The abscissa is a distance coordinate of the optical modulation structure 22 in FIG. 7 along the arrangement direction f of the first light-emitting unit 211 and the second light-emitting unit 212, and the unit is micron (μm). The ordinate is the optical path difference, and the unit is micron. It can be seen that the optical path difference c1 gradually increases along the direction f.

The inventors found through calculations that if the positions of the images of the light-emitting units on the entire display panel are shifted as a whole (that is, the shift direction and distance of the image of each light-emitting unit are the same), then the difference between the optical path difference at the $0^{th}$ μm position and the optical path difference at the $600^{th}$ μm position within every 600 μm of the optical modulation structure 22 in the arrangement direction f is required to be about 100 μm. Furthermore, the thickness of the optical modulation structure 22 may be relatively large.

Optionally, in the second state of the optical modulation structure, the optical path differences of the regions of the optical modulation structure periodically change. The periodically changing optical modulation structure can achieve the optical functions similar to a Fresnel lens. That is, the optical modulation structure can realize the position shift of the image of the light-emitting unit when the overall thickness is relatively large.

Exemplarily, FIG. 8 is another schematic cross-sectional view of the display panel shown in FIG. 5 at the position B-B in the second state. In the drawing, the optical modulation structure 22 may include a substrate 221 and a plurality of wedge-shaped lens structures 222a on the substrate 221. The plurality of wedge-shaped lens structures can realize the optical functions similar to the Fresnel lens, and can shift the position of the image of the light-emitting unit. It can be seen that the overall thickness of the optical modulation structure 22 shown in FIG. 8 is much less than the overall thickness of the optical modulation structure 22 shown in FIG. 6.

Figure 9:
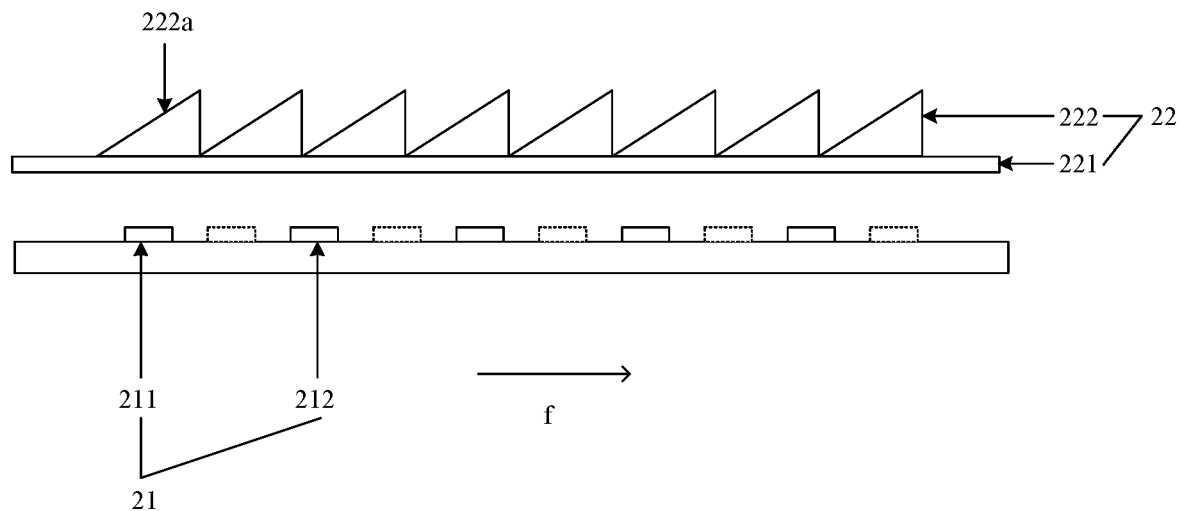
FIG. 9 is another schematic cross-sectional view of the display panel shown in FIG. 6 in the second state.

Exemplarily, the changing trend of the optical path difference of the optical modulation structure 22 shown in FIG. 8 may be as shown in FIG. 9. The abscissa is a distance coordinate of the optical modulation structure 22 in FIG. 8 along the arrangement direction f of the first light-emitting unit 211 and the second light-emitting unit 212, and the unit is μm. The ordinate is the optical path difference, and the unit is micron. It can be seen that the optical path difference c1 periodically changes along the direction f. Through experiments of the inventors, in the arrangement direction f of the first light-emitting unit 211 and the second light-emitting unit 212, the optical path difference of 0.4 μm within a distance of 0.3 μm can realize the image shift of the light-emitting unit. If the optical modulation structure 22 is implemented by a liquid crystal lens, then the Δn (birefringence) of a liquid crystal in the liquid crystal lens is 0.3, and the cell thickness of the liquid crystal is 0.3 μm.

Optionally, in the second state of the optical modulation structure 21, the optical modulation structure 21 has a plurality of periodic regions, and the optical path differences in the periodic regions gradually change along the lengthwise direction of the line connecting the two images of the first light-emitting unit 211 at the first position and the second position (the direction is parallel to the arrangement direction f of the first light-emitting unit 211 and the second light-emitting unit 212 in FIG. 8). Besides, the difference between the maximum optical path difference and the minimum optical path difference of the periodic regions is an integer multiple of the wavelength of the light emitted by the light-emitting unit in the optical modulation structure 21. In this way, the aberration generated by the optical modulation structure 21 can be reduced, and the display effect can be improved. Referring to FIG. 8, the region where each wedge-shaped lens structure 222a is disposed may be regarded as one periodic region, the leftmost optical path difference of each wedge-shaped lens structure 222a in the direction f is the minimum optical path difference, and the rightmost optical path difference is the maximum optical path difference. The difference between these two optical path differences is an integer multiple of the wavelength of the light emitted by the light-emitting unit.

For a determination method for the above periodic regions, reference may be made to the determination method for a Fresnel zone in the Fresnel lens. For example, the determination method may be described as follows.

Figure 10:
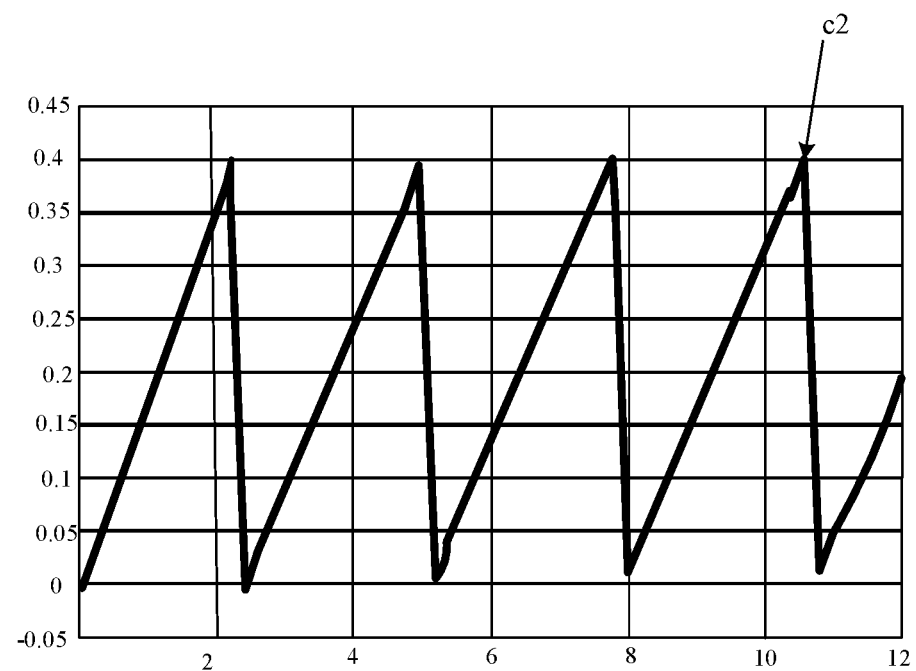
FIG. 10 is a changing trend diagram of an optical path difference of the display panel shown in FIG. 9.

By taking the optical path difference shown in FIG. 8 as an example, according to the principle that the optical path difference of a certain position subtracts the integer multiple of the wavelength of the light passing through such a position, the optical characteristics of the position remain unchanged, for each position where the optical path difference is greater than λ, in a curve shown in FIG. 8, the part of the optical path difference of the position which is greater than the integer multiple of the wavelength of the light is subtracted, such that a changing curve of the optical path difference similar to FIG. 10 may be obtained. Exemplarily, in the curve shown in FIG. 8, the coordinates of a certain interval are (201, 18.1), (202, 18.2), (203, 18.3), (204, 18.4), (205, 18.5), (206, 18.6), (207, 18.7), (208, 18.8), (209, 18.9), and (210, 18.10), if κ=0.5, and then all the parts greater than λ, in the coordinates of the interval are subtracted to obtain the coordinates (201, 0.1), (202, 0.2), (203, 0.3), (204, 0.4), (205, 0), (206, 0.1), (207, 0.2), (208, 0.3), (209, 0.4), and (210, 0). It can be seen that the ordinate changes at a period of 0.1, 0.2, 0.3, 0.4, and 0, and the period interval is the interval with the abscissa being (201, 205).

In the embodiment of the present disclosure, the foregoing optical modulation structure 22 may be implemented in multiple ways, which are described separately below.

Optionally, the optical modulation structure includes a liquid crystal lens panel.

Figure 11:
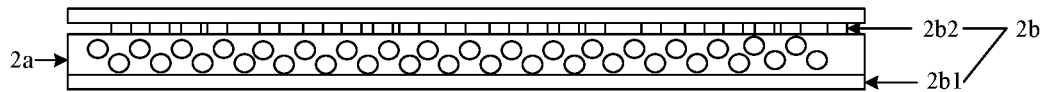
FIG. 11 is a schematic structural diagram of a liquid crystal lens panel according to an embodiment of the present disclosure.

As shown in FIG. 11, the liquid crystal lens panel includes a liquid crystal layer 2a and an electrode component 2b outside the liquid crystal layer. The liquid crystal layer may have two states when an electric field is applied and when no electric field is applied. When no electric field is applied to the liquid crystal, the state of the liquid crystal layer may correspond to the first state of the optical modulation structure. When the electric field is applied to the liquid crystal, the state of the liquid crystal layer may correspond to the second state of the optical modulation structure.

The electrode component 2b is configured to apply a periodically changing electric field to the liquid crystal layer 2a, such that optical path differences of regions of the liquid crystal layer periodically change. The electrode component 2b may include electrode structures 2b1 and 2b2 on both sides of the liquid crystal layer 2a. One electrode structure 2b1 may be an electrode layer, and the other electrode structure 2b2 may include a plurality of sub-electrodes arranged in an array. The arrangement density of the sub-electrodes may periodically change (for example, a period of several microns) along the arrangement direction of the first light-emitting unit and the second light-emitting unit to form a periodically changing electric field. Exemplarily, the changing trend of the density of the plurality of sub-electrodes may be similar to the changing trend of the optical path difference in FIG. 10.

The electrode component 2b applies a periodically changing electric field to the liquid crystal layer 2a, and the liquid crystal layer 2a can realize the changing trend of the optical path difference shown in FIG. 9, and then realize the image shift of the light-emitting unit.

The periodically changing electric field may be practiced by applying a periodically changing voltage to the electrodes of the electrode component. The value of the voltage applied to the electrodes may be determined in a plurality of ways. Exemplarily, in any period, a plurality of electrodes are arranged along a direction fx in this period, the voltage applied to a first electrode in the direction fx may be defined to an initial value (exemplarily, the initial value may be 0) less than a maximum drive voltage that is sustainable by the electrode, and the voltage applied to a last electrode in the direction fx may be defined to the maximum drive voltage that is sustainable by the electrode (or may be a value that is slightly less than the maximum drive voltage). The voltage to be applied to the electrodes between the first electrode and the last electrode may progressively increase from the initial value to the maximum drive voltage along the direction fx.

Figure 12:
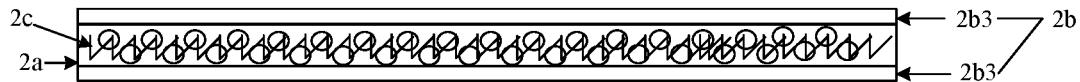
FIG. 12 is a schematic structural diagram of another liquid crystal lens panel according to an embodiment of the present disclosure.

As shown in FIG. 12, another liquid crystal lens panel includes a liquid crystal layer 2a, a lattice structure 2c inside the liquid crystal layer 2a, and an electrode component 2b outside the liquid crystal layer 2a. The lattice structure 2c is configured to enable the sensitivity to a voltage of regions of the liquid crystal layer to periodically change. In this way, the liquid crystal layer can also realize the changing trend of the optical path difference as shown in FIG. 10.

Exemplarily, the sensitivity to a voltage and the optical path difference may satisfy: $a=\Delta n*d*\sin Q$, wherein $\Delta n$ is the birefringence of the liquid crystal, d is the thickness of the liquid crystal layer, and Q is a deflection angle of the liquid crystal. After the voltage is applied to the liquid crystal layer, the long axis of the liquid crystal will be deflected toward the electric field.

A lattice density of the lattice structure 2c periodically changes. The changing trend of the lattice density of the lattice structure 2c may be similar to the changing trend of the optical path difference in FIG. 10. The lattice structure 2c may be formed by a mask with a periodically changing grayscale.

Optionally, a material of the lattice structure includes a polymer. At this time, the process of forming the lattice structure in the liquid crystal layer may include the following steps.

1. A polymerizable monomer is added to the liquid crystal.
2. The liquid crystal layer is formed by the liquid crystal added with the polymerizable monomer.
3. The liquid crystal layer is irradiated by ultraviolet light through the mask with a periodically changing grayscale to polymerize the polymer monomer in the liquid crystal layer, thereby forming the lattice structure with a periodically changing density.

The higher the density of the lattice structure is, the stronger the binding force on the liquid crystal is, and the higher the voltage required for rotating the liquid crystal is. Therefore, with the same voltage drive, the deflection of different degrees of the liquid crystal can be achieved, and the optical path difference of the liquid crystal layer can form a periodic change.

Optionally, the electrode component 2b includes electrode layers 2b3 on both sides of the liquid crystal layer. Since the liquid crystal layer can be driven by the electric field with an equal intensity in all parts to realize the optical functions, electrodes on both sides of the liquid crystal layer may be electrode layers, thereby simplifying a structure and a manufacturing process of the liquid crystal lens panel.

Figure 13:
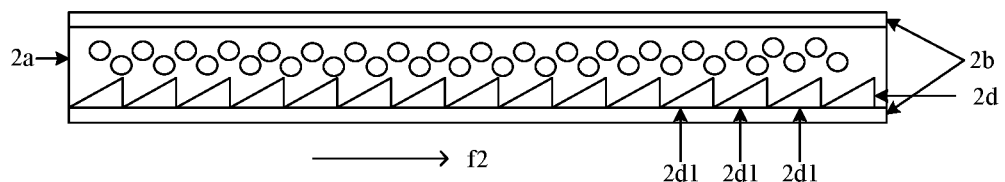
FIG. 13 is a schematic structural diagram of yet another liquid crystal lens panel according to an embodiment of the present disclosure.

As shown in FIG. 13, yet another liquid crystal lens panel includes a lens substrate 2d, a liquid crystal layer 2a, and an electrode component 2b outside the liquid crystal layer 2a. The lens substrate 2d has a plurality of lenses 2d1, through which the changing trend of the optical path difference of the lens substrate 2d1 may be similar to the changing trend of the optical path difference shown in FIG. 10. That is, along the arrangement direction f2 of the plurality of lenses 2d1, the optical path difference of the lens substrate 2d periodically changes with each lens 2d1 as a period, and further the lens substrate 2d can also realize the optical function of shifting the image of the light-emitting unit.

The liquid crystal layer 2a covers the plurality of lenses 2d1 and fills the gaps among the lenses 2d1. A refractive index of the liquid crystal layer 2a in the first operating state is the same as the refractive index of the lens. In such a state, the liquid crystal layer 2a and the lens substrate 2d are equivalent to a film structure with the same refractive index in each part, corresponding to the first state of the optical modulation structure. The first operating state of the liquid crystal layer 2a is one of an operating state when the electrode component applies a voltage to the liquid crystal layer and an operating state when the electrode component applies no voltage to the liquid crystal layer. Correspondingly, when the liquid crystal layer 2a is in the second operating state (the second operating state is the other operating state than the first operating state in the two operating states of the liquid crystal), and a refractive index of the liquid crystal layer 2a is different from that of the lens 2d1. The lens substrate 2d can restore the optical function of shifting the image of the light-emitting unit.

In the liquid crystal lens panel shown in FIG. 13, for the structure of the electrode component 2b, reference may be made to the liquid crystal lens panel shown in FIG. 12, which is not repeated herein in details.

Optionally, in the above liquid crystal lens panel, the liquid crystal layer may include one of a cholesteric liquid crystal and a blue phase liquid crystal. These two types of liquid crystals can control the polarized light of various polarization directions.

Figure 14:
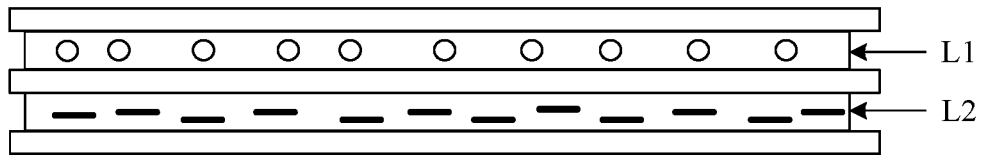
FIG. 14 is a schematic diagram of a double-layer orthogonally oriented liquid crystal structure in an embodiment of the present disclosure.

Optionally, in the above liquid crystal lens panel, the liquid crystal layer may include a double-layer orthogonally oriented liquid crystal structure. As shown in FIG. 14, the double-layer orthogonally oriented liquid crystal structure includes two sub-liquid crystal layers L1 and L2, and the orientations of the liquid crystals in the two sub-liquid crystal layers (L1 and L2) are perpendicular to each other. With such a structure, the double-layer orthogonally oriented liquid crystal structure can also control the polarized light in two polarization directions.

When the liquid crystal layer includes the double-layer orthogonally oriented liquid crystal structure, the liquid crystal lens panel may include two sub-electrode structures, and these two sub-electrode structures may be configured to respectively apply an electric field to the two sub-liquid crystal layers.

It should be noted that since the two liquid crystal layers of the double-layer orthogonally oriented liquid crystal structure have different distances from the light-emitting unit, the sub-electrode structures corresponding to the two sub-liquid crystal layers can be controlled differently.

Figure 15:
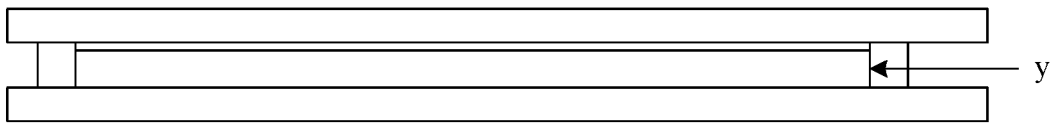
FIG. 15 is a schematic structural diagram of a liquid lens according to an embodiment of the present disclosure.

In addition, as shown in FIG. 15, the optical modulation structure includes a liquid lens. The liquid lens is a lens that includes a liquid and a control component controlling a surface curvature of the liquid. Exemplarily, the liquid lens may include a capacitive liquid lens.

When no voltage is applied to the liquid in the liquid lens, the structure may be as shown in FIG. 15. The liquid y in the liquid lens is in a flat state. At this time, the liquid lens is equivalent to a transparent film, corresponding to the first state of the optical modulation structure.

Figure 16:
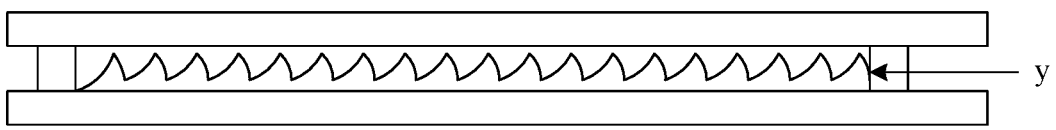
FIG. 16 is a schematic structural diagram of the liquid lens shown in FIG. 15 in a powered state.

When the voltage is applied to the liquid in the liquid lens, the structure may be as shown in FIG. 16. The liquid y in the liquid lens is in a deformed state, and the liquid has multiple wedge-shaped structures. The multiple wedge-shaped structures may be similar to the lenses $2d1$ of the lens substrate $2d$ in FIG. 13, and may also realize the periodic change of the optical path difference as shown in FIG. 10, corresponding to the second state of the optical modulation structure.

The liquid lens may be practiced in a plurality of ways. Exemplarily, a type of liquid lens has two liquids that are not mixed with each other. One of the liquids has the ability of electric conduction, and the other liquid does not have the ability of electric conduction. Thus, an interface between these two liquids can be controlled by an external electronic control structure, such that the interface has the function of the lens (that is, the ability of light deflection). When passing through the interface, the light will be deflected. In addition, the liquid lens in the embodiment of the present disclosure may also have other structures, which is not limited in the embodiment of the present disclosure.

In addition, in the embodiment of the present disclosure, the optical modulation structure may further include a plurality of electronically controlled lens structures corresponding to the light-emitting units one to one. For the electronically controlled lens structure, reference may be made to the above liquid crystal lens panel or liquid lens. These multiple lens structures are configured to shift the images of all light-emitting units in a one-to-one correspondence manner.

In summary, according to the display panel according to the embodiment of the present disclosure, with the optical modulation structure, each light-emitting unit is enabled to form two images at different positions in different states, and one of the images is between the two light-emitting units. In this way, without increasing the number of light-emitting units, the PPI observed by human eyes can be increased by continuously switching the state of the optical modulation structure, thereby further improving the display effect of the display panel.

Figure 17:
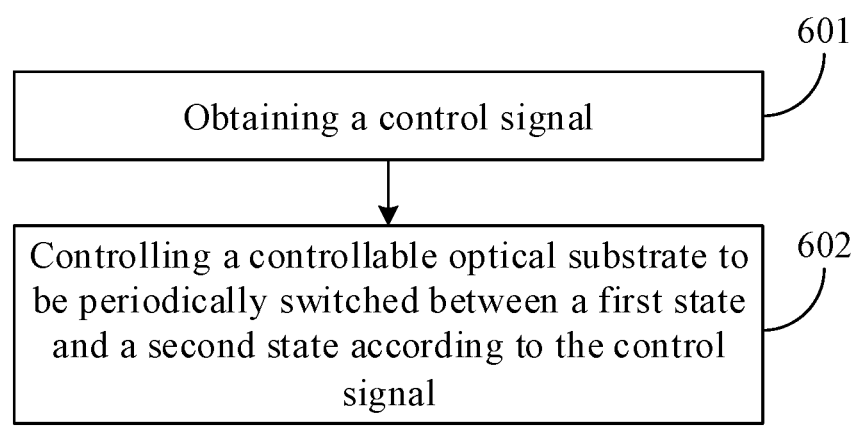
FIG. 17 is a flowchart of a method for controlling a display panel according to an embodiment of the present disclosure.

FIG. 17 is a flowchart of a method for controlling a display panel according to an embodiment of the present disclosure. The method is applicable to any display panel according to the above embodiment, and the method includes the following steps.

In step 601, a control signal is acquired.

The control signal may be acquired from a control component of the display panel, and the control component may be a control integrated circuit.

In step 602, the optical modulation structure is controlled to be periodically switched between the first state and the second state according to the control signal.

Optionally, according to the control signal, controlling the optical modulation structure to be in the first state in an $m^{th}$ time segment, and controlling the display panel to be in the second state in an $(m+1)^{th}$ time segment, in being a positive integer greater than zero. A length of the time segment is one frame or half of one frame. The frame herein is a time length for displaying one frame image on the display panel.

For example, when the length of the time segment is one frame, according to the control signal, the optical modulation structure is controlled to be in the first state when the display panel displays an $m^{th}$ frame image, the display panel is controlled to be in the second state when the display panel displays an $(m+1)^{th}$ frame image, and m is a positive integer greater than zero. Exemplarily, the $m^{th}$ frame may be an odd frame, and the $(m+1)^{th}$ frame may be an even frame. In this way, the PPI observed by the human eyes can be increased, and the display effect of the display panel can be improved.

In summary, in the method for controlling a display panel provided according to the embodiment of the present disclosure, by controlling the optical modulation structure to be periodically switched between the first state and the second state according to the control signal, the PPI observed by human eyes can be increased without increasing the number of light-emitting units, thereby further improving the display effect of the display panel.

In addition, an embodiment of the present disclosure also provides a display device, including any display panel according to the above embodiment. The display device may be various devices with a display function, such as a mobile phone, a tablet computer, a notebook computer and a desktop computer.

It should be noted that in the accompanying drawings, for clarity of the illustration, the dimension of the layers and regions may be scaled up. It may be understood that when an element or layer is described as being "above" another element or layer, the described element or layer may be directly on the other element or layer, or at least one intermediate layer may be arranged between the described element or layer and the other element or layer. In addition, it may be understood that when an element or layer is described as being "below" another element or layer, the described element or layer may be directly below the other element or layer, or at least one intermediate layer may be arranged between the described element or layer and the other element or layer. In addition, it may be further understood that when a layer or element is described as being arranged "between" two layers or elements, the described layer or element may be the only layer between the two layers or elements, or at least one intermediate layer or element may be arranged between the described element or layer and the two layers or elements. In the whole specification described above, like reference numerals denote like elements.

The term "first" or "second" used in the present disclosure is merely used to describe but not denote or imply any relative importance. The term "a plurality of" means two or more, unless otherwise expressly provided.

The foregoing descriptions are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A display panel, comprising a light-emitting substrate and an optical modulation structure which are laminated; wherein
   the light-emitting substrate comprises a plurality of light-emitting units, wherein the plurality of light-emitting units are micro light emitting diodes and arranged in rows and columns; and
   the optical modulation structure supports a first state and a second state which are switchable; wherein in the first state of the optical modulation structure, a first light-emitting unit of the plurality of light-emitting units is configured to form an image at a first position on a side of the optical modulation structure proximal to the light-emitting substrate; and in the second state of the optical modulation structure, the first light-emitting unit is configured to form an image at a second position on the side of the optical modulation structure proximal to the light-emitting substrate;

on a plane parallel to the optical modulation structure a distance between the first position and the second position is less than a distance between the first light-emitting unit and a second light-emitting unit; and the second light-emitting unit is any one of the plurality of light-emitting units other than the first light-emitting unit; and wherein in the first state of the optical modulation structure, optical path differences of regions of the optical modulation structure are equal; and wherein in the second state of the optical modulation structure, the optical path differences of the regions of the optical modulation structure periodically change.

2. The display panel according to claim 1, wherein in the second state of the optical modulation structure, a lengthwise direction of a line connecting the first position and the second position is parallel to one of a row direction and a column direction in which the plurality of light-emitting units are arranged.

3. The display panel according to claim 2, wherein the distance between the first position and the second position is approximately ½ of the distance between the first light-emitting unit and the second light-emitting unit, and the second light-emitting unit and the first light-emitting unit are adjacent light-emitting units in the arrangement direction of the plurality of light-emitting units.

4. The display panel according to claim 1, wherein in the second state of the optical modulation structure, the optical modulation structure has a plurality of periodic regions, the optical path differences in the periodic regions gradually change along the lengthwise direction of the line connecting the first position and the second position, and a difference between a maximum optical path difference and a minimum optical path difference of the periodic regions is an integer multiple of a wavelength of light emitted by the light-emitting unit in the optical modulation structure.

5. The display panel according to claim 1 wherein the optical modulation structure comprises a liquid crystal lens panel.

6. The display panel according to claim 5, wherein the liquid crystal lens panel comprises a liquid crystal layer and an electrode component, wherein the electrode component is configured to apply a periodically changing electric field to the liquid crystal layer, such that optical path differences of regions of the liquid crystal layer periodically change.

7. The display panel according to claim 5, wherein the liquid crystal lens panel comprises a liquid crystal layer, a lattice structure inside the liquid crystal layer, and an electrode component, wherein the lattice structure is configured to enable a sensitivity against voltage of regions of the liquid crystal layer to periodically change.

8. The display panel according to claim 7, wherein a lattice density of the lattice structure periodically changes.

9. The display panel according to claim 8, wherein a material of the lattice structure comprises a polymer.

10. The display panel according to claim 7, wherein the electrode component comprises electrode layers on both sides of the liquid crystal layer.

11. The display panel according to claim 5, wherein the liquid crystal lens panel comprises a lens substrate, a liquid crystal layer, and an electrode component;

wherein the lens substrate is provided with a plurality of lenses, the liquid crystal layer covers the plurality of lenses, a refractive index of the liquid crystal layer in a first operating state is the same as a refractive index of the lenses, and the first operating state is one of an operating state when the electrode component applies a voltage to the liquid crystal layer and an operating state when the electrode component does not apply the voltage to the liquid crystal layer.

12. The display panel according to claim 5, wherein the liquid crystal lens component comprises one of a cholesteric liquid crystal and a blue phase liquid crystal.

13. The display panel according to claim 5, wherein the liquid crystal lens component comprises a double-layer orthogonally oriented liquid crystal structure.

14. The display panel according to claim 1, wherein the optical modulation structure comprises a liquid lens.

15. The display panel according to claim 1, wherein in the first state of the optical modulation structure, optical path differences of regions of the optical modulation structure are equal, and in the second state of the optical modulation structure, the optical path differences of the regions of the optical modulation structure periodically change;

the plurality of light-emitting units are arranged in rows and columns, and when the optical modulation structure is in the second state, a lengthwise direction if a line connecting the first position and the second position is parallel to one of a row direction and a column direction of the plurality of light-emitting units;

a distance between the first position and the second position is approximately ½ of a distance between the first light-emitting unit and the second light-emitting unit, and the second light-emitting unit and the first light-emitting unit are adjacent light-emitting units in the arrangement direction of the plurality of light-emitting units;

in the second state, the optical modulation structure has a plurality of periodic regions, the optical path differences in the periodic regions gradually change along the lengthwise direction of the line connecting the first position and the second position, and a difference between a maximum optical path difference and a minimum optical path difference of the periodic regions is an integer multiple of a wavelength of light emitted by the light-emitting unit in the optical modulation structure; and the optical modulation structure comprises a liquid crystal lens panel comprising a liquid crystal layer and an electrode component, wherein the electrode component is configured to apply a periodically changing electric field to the liquid crystal layer to enable optical path differences of regions of the liquid crystal layer to periodically change.

16. A method for controlling a display panel, applicable to the display panel, the display panel comprising a light-emitting substrate and an optical modulation structure which are laminated;

wherein the light-emitting substrate comprises a plurality of light-emitting units; and the optical modulation structure supports a first state and a second state which are switchable; wherein in the first state of the optical modulation structure, a first light-emitting unit of the plurality of light-emitting units forms an image at a first position on a side of the optical modulation structure proximal to the light-emitting substrate; in the second state of the optical modulation structure, the first light-emitting unit forms an image at a second position on a side of the optical modulation structure proximal to the light-emitting substrate; on a plane parallel to the optical modulation structure, a distance between the first position and the second position is less than a distance between the first light-emitting unit and a second light-emitting unit, and the second light-emitting unit is any one of the plurality of light-emitting units other than the first light-emitting unit; and the method comprises:
    acquiring a control signal; and
    controlling the optical modulation structure to be periodically switched between the first state and the second state according to the control signal; and
    wherein the plurality of light-emitting units are micro light emitting diodes and arranged in rows and columns;
    wherein in the first state of the optical modulation structure, optical path differences of regions of the optical modulation structure are equal; and
    wherein in the second state of the optical modulation structure, the optical path differences of the regions of the optical modulation structure periodically change.

17. The method according to claim 16, wherein controlling the display panel to be periodically switched between the first state and the second state according to the control signal comprises:

according to the control signal, controlling the optical modulation structure to be in the first state in an $m^{th}$ time segment, and controlling the display panel to be in the second state in an $(m+1)^{th}$ time segment, m being a positive integer greater than zero.

18. The method according to claim 17, wherein a length of the time segment is one frame or half of one frame.

* * * * *